United States Patent
Im et al.

(10) Patent No.: US 12,503,547 B2
(45) Date of Patent: Dec. 23, 2025

(54) POLYOL COMPOSITION USING GLUCOSE-CONTAINING SACCHARIDE COMPOSITION, AND POLYURETHANE FOAM INCLUDING SAME

(71) Applicant: SAMYANG CORPORATION, Seoul (KR)

(72) Inventors: Jun Seop Im, Hwaseong-si (KR); Hoon Ryu, Daejeon (KR)

(73) Assignee: SAMYANG CORPORATION, Seoul (KR)

( * ) Notice: Subject to any disclaimer, the term of this patent is extended or adjusted under 35 U.S.C. 154(b) by 524 days.

(21) Appl. No.: 18/014,593

(22) PCT Filed: Jul. 5, 2021

(86) PCT No.: PCT/KR2021/008508
§ 371 (c)(1),
(2) Date: Jan. 5, 2023

(87) PCT Pub. No.: WO2022/010208
PCT Pub. Date: Jan. 13, 2022

(65) Prior Publication Data
US 2023/0250213 A1    Aug. 10, 2023

(30) Foreign Application Priority Data

Jul. 6, 2020   (KR) .................. 10-2020-0082702

(51) Int. Cl.
| | |
|---|---|
| C08G 18/08 | (2006.01) |
| C08G 18/18 | (2006.01) |
| C08G 18/20 | (2006.01) |
| C08G 18/32 | (2006.01) |
| C08G 18/40 | (2006.01) |
| C08G 18/48 | (2006.01) |
| C08G 18/64 | (2006.01) |
| C08G 18/76 | (2006.01) |
| C08G 65/26 | (2006.01) |
| C08G 101/00 | (2006.01) |

(52) U.S. Cl.
CPC ......... *C08G 18/3218* (2013.01); *C08G 18/14* (2013.01); *C08G 18/6484* (2013.01); *C08G 18/7664* (2013.01); *C08G 2101/00* (2013.01)

(58) Field of Classification Search
CPC ... C07H 3/10; C08G 18/6484; C08G 2650/26
See application file for complete search history.

(56) References Cited

U.S. PATENT DOCUMENTS

2015/0329448 A1    11/2015    Ryu et al.

FOREIGN PATENT DOCUMENTS

| | | |
|---|---|---|
| JP | 2013-142128 A | 7/2013 |
| KR | 10-1079518 B1 | 11/2011 |
| KR | 10-2014-0080749 A | 7/2014 |
| KR | 10-2017-0015290 A | 2/2017 |
| KR | 10-2019-0054913 A | 5/2019 |
| KR | 10-2019-0137431 A | 12/2019 |
| WO | WO 2012/081785 A1 | 6/2012 |

OTHER PUBLICATIONS

Machine translation of KR 20190137431 obtained from the European Patent Office website in Aug. 2025 (Year: 2025).*
International Search Report, issued in PCT/KR2021/008508, PCT/ISA/210, dated Oct. 18, 2021.

* cited by examiner

*Primary Examiner* — Melissa A Rioja
(74) *Attorney, Agent, or Firm* — Birch, Stewart, Kolasch & Birch, LLP

(57) ABSTRACT

The present invention pertains to: a polyol composition containing a polysaccharide alcohol, a polysaccharide alcohol-derived anhydrosugar alcohol, and an anhydrosugar alcohol polymer; and a polyurethane foam including same. More specifically, the present invention pertains to: a polyol composition containing a) a monoanhydrosugar alcohol, b) a dianhydrosugar alcohol, c) a polysaccharide alcohol, d) a polysaccharide alcohol-derived anhydrosugar alcohol, and e) at least one polymer of a) to d), wherein physical properties such as the number average molecular weight (Mn), polydispersity index (PDI), and average number of OH groups per molecule of the polyol composition satisfy certain levels, the polyol composition can contribute to the improvement of physical properties such as strength, elongation, and thermal insulation when used as a raw material for polyurethane, etc., using a hydrogenated sugar composition obtained from a saccharide mixture containing glucose and polysaccharides (disaccharides or higher saccharides) improves productivity, and costs can be reduced compared to the case of using conventional high-purity hydrogenated sugar; and a polyurethane foam including same.

14 Claims, No Drawings

US 12,503,547 B2

POLYOL COMPOSITION USING GLUCOSE-CONTAINING SACCHARIDE COMPOSITION, AND POLYURETHANE FOAM INCLUDING SAME

TECHNICAL FIELD

The present invention relates to a polyol composition using a glucose-containing saccharide composition and polyurethane foam including same, and more specifically, to a polyol composition using a glucose-containing saccharide composition which can produce polyurethane foam that exhibits improved molding density, compressive strength and excellent thermal insulation property (low thermal conductivity) without degrading existing physical properties by comprising a) monoanhydrosugar alcohol; b) dianhydrosugar alcohol; c) a polysaccharide alcohol represented by the following Formula 1; d) anhydrosugar alcohol derived from a polysaccharide alcohol represented by the following Formula 1; and e) a polymer of one or more of a) to d) and satisfying the physical property conditions of the polyol composition, such as number average molecular weight (Mn), polydispersity index (PDI) and average number of OH groups per molecule, and improve productivity and reduce cost by using a hydrogenated sugar composition obtained from a saccharide mixture containing glucose and polysaccharide (disaccharide or higher saccharide) instead of hydrogenated sugar obtained from high-purity glucose, and polyurethane foam including same.

BACKGROUND ART

Hydrogenated sugar (also known as "sugar alcohol") refers to a compound obtained by adding hydrogen to the reducing terminal group of a saccharide. Generally, it has the formula $HOCH_2(CHOH)_nCH_2OH$ (wherein n is an integer of 2 to 5) and is classified into tetritol, pentitol, hexitol and heptitol (having 4, 5, 6 and 7 carbon atoms, respectively) depending on the number of carbon atoms. Among them, hexitol having 6 carbon atoms includes sorbitol, mannitol, iditol, galactitol and the like, and sorbitol and mannitol are particularly useful substances.

Anhydrosugar alcohol is a substance formed by removing one or more water molecules from the inside of hydrogenated sugar. When one water molecule is removed, it has the form of tetraol with four hydroxyl groups in the molecule, and when two water molecules are removed, it has a diol form with two hydroxyl groups in the molecule, and it can be prepared using hexitol derived from starch (for instance, Korean Patent No. 10-1079518 and Korean Patent Laid-open Publication No. 10-2012-0066904). Since anhydrosugar alcohol is an eco-friendly substance derived from renewable natural resources, there has been much interest in it for a long time, and studies of the production method have been carried out. Among these anhydrosugar alcohols, isosorbide prepared from sorbitol presently has the largest industrial application range.

Anhydrosugar alcohol is widely used in the treatment of cardiac and vascular diseases, adhesives for patches, drugs for mouthwash and the like, solvents for compositions in the cosmetics industry and emulsifiers in the food industry. In addition, it is possible to increase the glass transition temperature of a polymer such as polyester, PET, polycarbonate, polyurethane and epoxy resin, and to improve the strength of these materials, and it is also very useful in the plastics industry such as bioplastics since it is an eco-friendly material derived from natural materials. It is also known to be used as adhesives, eco-friendly plasticizers, biodegradable polymers and an eco-friendly solvent for water-soluble lacquers.

As such, anhydrosugar alcohol has attracted a great deal of attention due to its versatility, and its use in industry is increasing.

Conventionally, the by-product obtained in the process of producing anhydrous sugar alcohol by dehydration of hydrogenated sugar was not considered for special use, such as simply using it as a binder.

Korean Patent Laid-open Publication No. 10-2017-0015290 discloses a polyol composition containing anhydrosugar alcohol and anhydrosugar alcohol polymer, prepared by simple distillation under reduced pressure after dehydration of hydrogenated sugar. However, as disclosed in this patent document, when a polyol composition is prepared using sorbitol of 99% or more purity, the distillation yield of dianhydrosugar alcohol (e.g., isosorbide) is low due to a low ratio of polysaccharide (disaccharide or higher saccharide) alcohol and anhydrosugar alcohol derived therefrom when purified through distillation after dehydration reaction. In addition, when the polyol composition disclosed in this patent document is used as a polyol component of polyurethane foam, there is a problem in that physical properties such as molding density, compressive strength and thermal insulation of the manufactured polyurethane foam are low.

CONTENTS OF THE INVENTION

Problems to be Solved

The purpose of the present invention is to provide a polyol composition using a glucose-containing saccharide composition which can produce polyurethane foam that exhibits improved molding density, compressive strength and excellent thermal insulation property (low thermal conductivity) without degrading existing physical properties by comprising a) monoanhydrosugar alcohol; b) dianhydrosugar alcohol; c) a polysaccharide alcohol represented by the following Formula 1; d) anhydrosugar alcohol derived from a polysaccharide alcohol represented by the following Formula 1; and e) a polymer of one or more of a) to d) and satisfying the physical property conditions of the polyol composition, such as number average molecular weight (Mn), polydispersity index (PDI) and average number of OH groups per molecule, and improve productivity and reduce cost by using a hydrogenated sugar composition obtained from a saccharide mixture containing glucose and polysaccharide (disaccharide or higher saccharide) instead of hydrogenated sugar obtained from high-purity glucose, and polyurethane foam including same.

Technical Means

In order to achieve the technical purpose, in the first aspect, the present invention provides a polyol composition comprising: a) monoanhydrosugar alcohol; b) dianhydrosugar alcohol; c) a polysaccharide alcohol represented by the following Formula 1; d) anhydrosugar alcohol derived from a polysaccharide alcohol represented by the following Formula 1; and e) a polymer of one or more of a) to d); wherein (i) the composition has a number average molecular weight (Mn) of 193 to 1,589 g/mol; (ii) the composition has a polydispersity index (PDI) of 1.13 to 3.41; and (iii) the average number of —OH groups per molecule in the composition is 2.54 to 21.36:

[Formula 1]

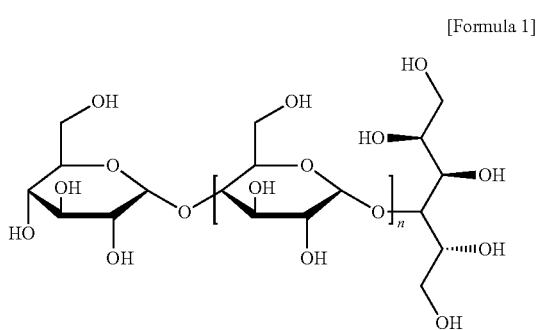

In Formula 1, n is an integer of 0 to 4.

In another aspect, the present invention provides an alkylene oxide-added polyol composition prepared by adding an alkylene oxide to the polyol composition of the present invention.

In another aspect, the present invention provides a polyol premix composition comprising a polyol component, a catalyst, a surfactant and a blowing agent, wherein the polyol component is the alkylene oxide-added polyol composition of the present invention or a mixture of the alkylene oxide-added polyol composition of the present invention and a polyol other than the alkylene oxide-added polyol composition.

In another aspect, the present invention provides a two-component type composition for preparing polyurethane foam, comprising the polyol premix composition of the present invention as a first component; and a polyisocyanate as a second component.

In another aspect, the present invention provides a method for preparing polyurethane foam, comprising mixing and reacting the polyol premix composition of the present invention as a first component; and a polyisocyanate as a second component.

In another aspect, the present invention provides a polyurethane foam prepared by mixing and reacting the polyol premix composition of the present invention as a first component; and a polyisocyanate as a second component.

Effect of the Invention

Since the polyol composition according to the present invention comprises not only monoanhydrosugar alcohols and dianhydrosugar alcohols, but also polysaccharide alcohols, anhydrosugar alcohol derived from a polysaccharide alcohol and at least one polymer thereof, the polyol composition can produce polyurethane foam that exhibits improved molding density, compressive strength and excellent thermal insulation property (low thermal conductivity) without degrading existing physical properties.

In addition, since the polyol composition of the present invention is prepared using a hydrogenated sugar composition obtained from a saccharide mixture containing glucose and polysaccharide (disaccharide or higher saccharide), polysaccharide (disaccharide or higher saccharide) alcohol and anhydrosugar alcohol derived therefrom increase fluidity, improving flowability during distillation, thereby improving the distillation yield of dianhydrosugar alcohol (e.g., isosorbide) in the distillate. Therefore, compared to the prior art, the cost of raw materials used can be reduced, and productivity can be improved due to the improvement of distillation yield of anhydrosugar alcohol.

In addition, the polyol composition of the present invention can be obtained by utilizing by-products obtained in the process of producing internal dehydration of hydrogenated sugar, thereby improving economic feasibility and eco-friendliness by solving the problem of by-product disposal. In particular, since the initial raw material is not a high-purity glucose product, but a saccharide composition containing impurities other than glucose (such as disaccharide or higher polysaccharide, etc.), it is possible to further improve economic feasibility due to cost reduction.

CONCRETE MODE FOR CARRYING OUT THE INVENTION

The present invention is explained in more detail below.
The polyol composition of the present invention comprises: a) monoanhydrosugar alcohol; b) dianhydrosugar alcohol; c) a polysaccharide alcohol represented by the following Formula 1; d) anhydrosugar alcohol derived from a polysaccharide alcohol represented by the following Formula 1; and e) a polymer of one or more of a) to d):

[Formula 1]

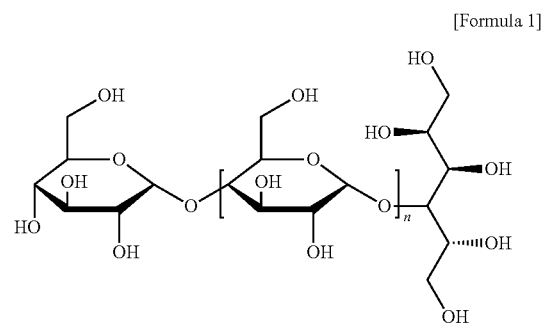

In Formula 1, n is an integer of 0 to 4.

Anhydrosugar alcohol can be produced by dehydrating natural product-derived hydrogenated sugar. Hydrogenated sugar (also known as "sugar alcohol") refers to a compound obtained by adding hydrogen to the reducing terminal group of a saccharide. Generally, it has the formula $HOCH_2(CHOH)_nCH_2OH$ (wherein n is an integer of 2 to 5) and is classified into tetritol, pentitol, hexitol and heptitol (having 4, 5, 6 and 7 carbon atoms, respectively) depending on the number of carbon atoms. Among them, hexitol having 6 carbon atoms includes sorbitol, mannitol, iditol, galactitol and the like, and sorbitol and mannitol are particularly useful substances.

One or more, preferably two or more, more preferably all of a) monoanhydrosugar alcohol; b) dianhydrosugar alcohol; c) a polysaccharide alcohol represented by the following Formula 1; d) anhydrosugar alcohol derived from a polysaccharide alcohol represented by the following Formula 1; and e) a polymer of one or more of a) to d) comprised in the polyol composition of the present invention can be obtained by hydrogenating a glucose-containing saccharide composition (e.g., a saccharide composition comprising disaccharides or higher polysaccharides including glucose, mannose, fructose and maltose) to prepare a hydrogenated sugar composition, heating the obtained hydrogenated sugar composition under an acid catalyst to a dehydration reaction by heating and conducting thin-film-distillation of the obtained dehydration reaction product. More specifically, all of a) to e) comprised in the polyol composition of the present invention may be by-products remaining after obtaining a thin-film distillate by thin-film-distillation of the obtained dehydration reaction product.

Monoanhydrosugar alcohol is anhydrosugar alcohol formed by removing one water molecule from the inside of hydrogenated sugar and has a tetraol form with four hydroxyl groups in the molecule.

In the present invention, the type of a) monoanhydrosugar alcohol is not particularly limited, but may be preferably monoanhydrosugar hexitol, and more specifically, 1,4-anhydrohexitol, 3,6-anhydrohexitol, 2,5-anhydrohexitol, 1,5-anhydrohexitol, 2,6-anhydrohexitol or a mixture of two or more thereof.

Dianhydrosugar alcohol is anhydrosugar alcohol formed by removing two water molecules from the inside of hydrogenated sugar, has a diol form with two hydroxyl groups in the molecule and can be prepared by using hexitol derived from starch. Since dianhydrosugar alcohol is an eco-friendly material derived from renewable natural resources, research on its manufacturing method has been conducted with much interest for a long time. Among these dianhydrosugar alcohols, isosorbide prepared from sorbitol currently has the widest range of industrial applications.

In the present invention, the type of b) dianhydrosugar alcohol is not particularly limited, but may be preferably dianhydrosugar hexitol, more specifically, it may be 1,4:3,6-dianhydrohexitol. The 1,4:3,6-dianhydrohexitol may be isosorbide, isomannide, isoidide or a mixture of two or more thereof.

In the present invention, c) the polysaccharide alcohol represented by the following Formula 1 can be prepared by hydrogenation of disaccharides or higher polysaccharides including maltose.

[Formula 1]

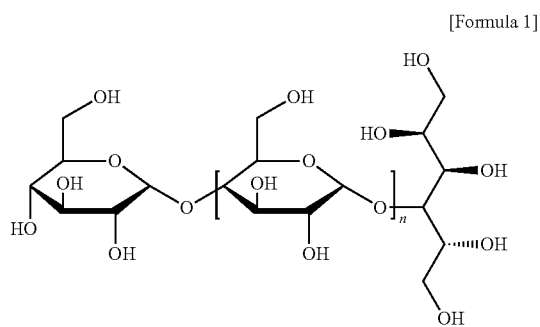

In Formula 1, n is an integer of 0 to 4.

In the present invention, d) anhydrosugar alcohol derived from polysaccharide alcohol represented by Formula 1 may be selected from a compound represented by the following Formula 2, a compound represented by the following Formula 3 or a mixture thereof:

[Formula 2]

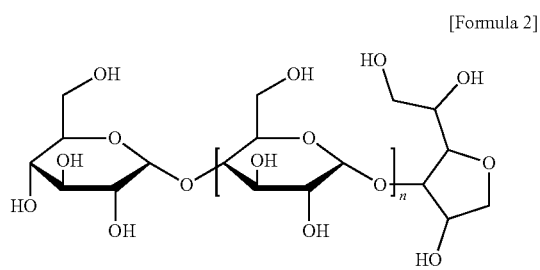

-continued

[Formula 3]

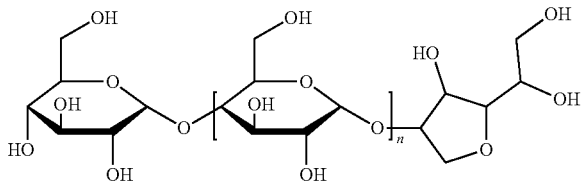

In Formulae 2 and 3, each of n is independently an integer of 0 to 4.

In the present invention, e) the polymer of one or more of a) to d) may comprise at least one selected from the group consisting of condensation polymers prepared from the following condensation reaction. In the following condensation reaction, the condensation position and condensation sequence between the monomers are not particularly limited, and may be selected without limitation within a range that could be commonly predicted by a person skilled in the art:

condensation reaction of monoanhydrosugar alcohol,
condensation reaction of dianhydrosugar alcohol,
condensation reaction of the polysaccharide alcohol represented by Formula 1,
condensation reaction of anhydrosugar alcohol derived from polysaccharide alcohol represented by Formula 1,
condensation reaction of monoanhydrosugar alcohol and dianhydrosugar alcohol,
condensation reaction of monoanhydrosugar alcohol and polysaccharide alcohol represented by Formula 1,
condensation reaction of monoanhydrosugar alcohol and anhydrosugar alcohol derived from polysaccharide alcohol represented by Formula 1,
condensation reaction of dianhydrosugar alcohol and polysaccharide alcohol represented by Formula 1,
condensation reaction of dianhydrosugar alcohol and anhydrosugar alcohol derived from polysaccharide alcohol represented by Formula 1,
condensation reaction of polysaccharide alcohol represented by Formula 1 and anhydrosugar alcohol derived from polysaccharide alcohol represented by Formula 1,
condensation reaction of monoanhydrosugar alcohol, dianhydrosugar alcohol and polysaccharide alcohol represented by Formula 1,
condensation reaction of monoanhydrosugar alcohol, dianhydrosugar alcohol and anhydrosugar alcohol derived from polysaccharide alcohol represented by Formula 1,
condensation reaction of monoanhydrosugar alcohol, polysaccharide alcohol represented by Formula 1 and anhydrosugar alcohol derived from polysaccharide alcohol represented by Formula 1,
condensation reaction of dianhydrosugar alcohol, polysaccharide alcohol represented by Formula 1 and anhydrosugar alcohol derived from polysaccharide alcohol represented by Formula 1, or
condensation reaction of monoanhydrosugar alcohol, dianhydrosugar alcohol, polysaccharide alcohol represented by Formula 1 and anhydrosugar alcohol derived from polysaccharide alcohol represented by Formula 1.

In one embodiment, in the polyol composition of the present invention, 0.1 to 20 wt %, specifically 0.6 to 20 wt %, more specifically 0.7 to 15 wt % of the a) monoanhydrosugar alcohol may be comprised, 0.1 to 28 wt %, specifically 1 to 25 wt %, more specifically 3 to 20 wt % of the b) dianhydrosugar alcohol may be comprised, the total content of c) polysaccharide alcohol represented by Formula 1 and d) anhydrosugar alcohol derived from polysaccharide alcohol represented by Formula 1 may be 0.1 to 6.5 wt %, specifically 0.5 to 6.4 wt %, more specifically 1 to 6.3 wt %, and 55 to 90 wt %, specifically 60 to 89.9 wt %, more specifically 70 to 89.9 wt % of e) one or more polymers of a) to d) based on the total weight of the composition, but they are not particularly limited thereto.

In the polyol composition of the present invention, the number average molecular weight (Mn) of the polyol composition may be 193 or more, 195 or more, 200 or more, 202 or more, 205 or more, or 208 or more. In addition, the number average molecular weight (Mn) of the polyol composition of the present invention may be 1,589 or less, 1,560 or less, 1,550 or less, 1,520 or less, 1,500 or less, 1,490 or less, or 1,480 or less.

In one embodiment, the number average molecular weight (Mn) of the polyol composition may be 193 to 1,589, specifically 195 to 1,550, more specifically 200 to 1,520, more specifically 202 to 1,500, and much more specifically 205 to 1,490. If the number average molecular weight of the polyol composition is less than 193, it may be difficult to form a foam when producing polyurethane foam using the polyol composition as a polyol component, and if the number average molecular weight of the polyol composition is more than 1,589, molding density, compressive strength, and thermal insulation properties of the foam may be deteriorated when producing polyurethane foam using the polyol composition as a polyol component.

In the polyol composition of the present invention, the polydispersity index (PDI) of the polyol composition may be 1.13 or more, 1.15 or more, 1.20 or more, 1.23 or more, or 1.25 or more. In addition, the polydispersity index (PDI) of the polyol composition of the present invention may be 3.41 or less, 3.40 or less, 3.35 or less, 3.30 or less, 3.25 or less, 3.22 or less, or 3.19 or less.

In one embodiment, the polydispersity index (PDI) of the polyol composition may be 1.13 to 3.41, specifically 1.13 to 3.40, more specifically 1.15 to 3.35, more specifically 1.20 to 3.35, and much more specifically 1.23 to 3.22. If the polydispersity index of the polyol composition is less than 1.13, it may be difficult to form the foam when producing polyurethane foam using the polyol composition as a polyol component, and if the polydispersity index of the polyol composition is more than 3.41, molding density, compressive strength and heat insulating properties of the foam may be deteriorated when producing polyurethane foam using the polyol composition as a polyol component.

In the polyol composition of the present invention, the average number of —OH groups per molecule in the polyol composition may be 2.54 or more, 2.60 or more, 2.65 or more, 2.70 or more, 2.75 or more, or 2.78 or more. Further, the average number of —OH groups per molecule in the polyol composition of the present invention may be 21.36 or less, 21.30 or less, 21.0 or less, 20.5 or less, 20.0 or less, 19.95 or less, or 19.92 or less.

More specifically, the average number of —OH groups per molecule in the polyol composition may be 2.54 to 21.36, more specifically 2.60 to 21.30, and even more specifically 2.65 to 21.0. If the average number of —OH groups per molecule in the polyol composition is less than 2.54, it may be difficult to form the foam when producing polyurethane foam using the polyol composition as a polyol component, and if the average number of —OH groups is more than 21.36, molding density, compressive strength and thermal insulation properties of the foam may be deteriorated when producing polyurethane foam using the polyol composition as a polyol component.

In one embodiment, the polyol composition of the present invention can be prepared by hydrogenating a glucose-containing saccharide composition (e.g., a saccharide composition comprising disaccharides or higher polysaccharides including glucose, mannose, fructose and maltose) to prepare a hydrogenated sugar composition, heating the obtained hydrogenated sugar composition under an acid catalyst to a dehydration reaction by heating and conducting thin-film-distillation of the obtained dehydration reaction product. More specifically, the polyol composition of the present invention may be by-products remaining after obtaining a thin-film distillate by thin-film-distillation of the obtained dehydration reaction product.

More specifically, the hydrogenation may be carried out on a glucose-containing saccharide composition under a hydrogen pressure condition of 30 to 80 atm and a heating condition of 110° C. to 135° C. to prepare a hydrogenated sugar composition, and the dehydration reaction of the obtained hydrogenated sugar composition may be carried out under reduced pressure condition of 1 mmHg to 100 mmHg and heating condition of 105° C. to 200° C. to obtain a dehydration reaction product, and thin-film-distillation of the obtained dehydration reaction product may be conducted under reduced pressure condition of 2 mbar or less and heating condition of 150° C. to 175° C., but the reaction conditions are not limited thereto.

The glucose content of the glucose-containing saccharide composition may be 41 wt % or more, 42 wt % or more, 45 wt % or more, 47 wt % or more, or 50 wt % or more, and may be 99.5 wt % or less, 99 wt % or less, 98.5 wt % or less, 98 wt % or less, 97.5 wt % or less, or 97 wt % or less—for example, 41 to 99.5 wt %, 45 to 98.5 wt %, or 50 to 98 wt %, based on the total weight of the glucose-containing saccharide composition.

If the glucose content in the saccharide composition is less than 41 wt %, the number average molecular weight, average number of —OH groups per molecule and polydispersity index of the polyol composition become too high, and the molding density, compressive strength and thermal insulation properties of the foam may be poor when producing polyurethane foam using the polyol composition as a polyol component, and if the glucose content in the saccharide composition is more than 99.5 wt %, the number average molecular weight and polydispersity index of the polyol composition may be too low and make it difficult to form polyurethane foam.

The content of polysaccharide alcohol (disaccharide or higher sugar alcohol) comprised in the hydrogenated sugar composition may be 0.8 wt % or more, 1 wt % or more, 2 wt % or more, or 3 wt % or more, and may be 57 wt % or less, 55 wt % or less, 52 wt % or less, 50 wt % or less, or 48 wt % or less—for example, 0.8 to 57 wt %, 1 to 55 wt % or 3 to 50 wt %, based on the total dry weight of the hydrogenated sugar composition (herein, the dry weight means the weight of solids remaining after water is removed from the hydrogenated sugar composition).

If the content of the polysaccharide alcohol in the hydrogenated sugar composition is less than 0.8 wt %, the effect of increasing fluidity due to the polysaccharide alcohol and anhydrosugar alcohol derived therefrom is insignificant, and the distillation yield of dianhydrosugar alcohol (e.g., isosorbide) may be lowered. If the content of the polysaccharide alcohol in the hydrogenated sugar composition is more than 57 wt %, there may be a problem in that the distillation yield of dianhydrosugar alcohol is significantly lowered when the dehydration reaction product of the hydrogenated sugar composition is thin-film distilled.

In addition, if the content of the polysaccharide alcohol in the hydrogenated sugar composition is less than 0.8 wt %, polyurethane foam itself may not be formed, or even if the foam is formed, it may be difficult to maintain the shape of the foam when a polyol composition is prepared using the hydrogenated sugar composition and polyurethane foam is formed by applying the polyol composition. If the content of the polysaccharide alcohol in the hydrogenated sugar composition is more than 57 wt %, the viscosity of the polyol composition prepared using this hydrogenated sugar composition may become very high, resulting in poor processability of polyurethane foam, and the physical properties such as thermal insulation of the prepared polyurethane foam may deteriorate due to increased thermal conductivity.

In other aspect, the present invention provides an alkylene oxide-added polyol composition prepared by adding an alkylene oxide to the polyol composition of the present invention.

In the alkylene oxide-added polyol composition of the present invention, the amount of the added alkylene oxide may be 10 parts by weight or more, 20 parts by weight or more, 30 parts by weight or more, 50 parts by weight or more, 80 parts by weight or more or 90 parts by weight or more, and may be 200 parts by weight or less, 180 parts by weight or less, 150 parts by weight or less, 120 parts by weight or less or 110 parts by weight or less—for example, 10 to 200 parts by weight, 20 to 180 parts by weight, 50 to 150 parts by weight, 80 to 120 parts by weight or 90 to 110 parts by weight, per 100 parts by weight of the polyol composition. If the amount of the added alkylene oxide is less than 10 parts by weight, the viscosity of the polyol composition to which the alkylene oxide is added may be too high, make polyurethane blending and preparation difficult. If the amount of the added alkylene oxide is more than 200 parts by weight, the effect of the added alkylene oxide may be increased and the characteristics of the polyol composition, which is the core, are not expressed, so the effect of improving the physical properties of the polyurethane may be insignificant.

In another aspect, the present invention provides a polyol premix composition comprising a polyol component, a catalyst, a surfactant and a blowing agent, wherein the polyol component is the alkylene oxide-added polyol composition of the present invention or a mixture of the alkylene oxide-added polyol composition of the present invention and a polyol other than the alkylene oxide-added polyol composition.

In the present invention, as the polyol component, the above-described alkylene oxide-added polyol composition may be used alone or other polyols may be mixed and used together with the above-described alkylene oxide-added polyol composition. Polyols other than the alkylene oxide-added polyol composition may be used without limitation as long as they are conventional polyols used for producing polyurethane foam.

In one embodiment, the polyol other than the alkylene oxide-added polyol composition may be, for example, a trifunctional polyether polyol having an active hydrogen equivalent of 3,000 to 5,000 and a hydroxyl value of 50 to 70 mgKOH/g, a sorbitol-based polyol having hydroxyl value of 400 to 600 mgKOH/g, a basic polyol having hydroxyl value of 400 to 600 mgKOH/g, glycerin and pentaerythritol-based polyol having hydroxyl value of 300 to 500 mgKOH/g, polyols having hydroxyl value of 300 to 350 mgKOH/g and the like may be used, but the polyol other than the alkylene oxide-added polyol is not limited thereto.

In one embodiment, when a mixture of the aforementioned alkylene oxide-added polyol composition and a polyol other than the polyol composition is used as the polyol component, the content of the alkylene oxide-added polyol composition may be 1 wt % or more, preferably 5 wt % or more, more preferably 10 wt % or more based on the total weight of the mixture. If the content of the polyol composition to which the alkylene oxide is added is less than 1 wt %, the effect of improving the physical properties of polyurethane foam (e.g., molding density, hardness, compressive strength and thermal insulation, etc.), eco-friendliness and the resulting economic feasibility due to cost reduction may be insignificant.

The catalyst used in the present invention is not particularly limited but may be an amine catalyst, an organometallic catalyst or a mixture thereof, which promotes the reaction between the polyol and the isocyanate compound.

In the present invention, the type of amine catalyst is not particularly limited, but preferably one or a mixture of two or more selected from among tertiary amine catalysts may be used, and more specifically, one selected from the group consisting of triethylene diamine, triethylamine, N-methyl morpholine, N-ethyl morpholine or combinations thereof may be used.

As the organometallic catalyst, an organometallic catalyst commonly used in the production of polyurethane foam may be used—for example, an organotin catalyst, more specifically, one selected from the group consisting of tin octylate, dibutyltin dilaurate (DBTDL), tin bis [2-ethylhexanoate] or combinations thereof may be used.

In the polyol premix composition of the present invention, the catalyst may be comprised in an amount of 0.01 to 5 parts by weight, more preferably 0.1 to 2.5 parts by weight, based on 100 parts by weight of the polyol component. If the amount of the catalyst used is too small, the reaction may be delayed and curing failure may occur or the foam may collapse during formation. If the amount of the catalyst used is too much, reactions may be too rapid or contractions may occur.

The surfactant used in the present invention serves to prevent the cells generated from being united or destroyed when cells are formed inside the polyurethane foam, and to adjust the cells having a uniform shape and size to be formed.

In the present invention, the surfactant may be used without particular limitation as long as it is commonly used in the production of polyurethane foam—for example, a silicone-based surfactant may be preferably used. The silicone-based surfactant may be at least one selected from silicone oil and derivatives thereof, and specifically may be a polyalkylene oxide methylsiloxane copolymer.

In the polyol premix composition of the present invention, the surfactant may be comprised in an amount of 0.01 to 10 parts by weight, preferably 0.1 to 8 parts by weight, more preferably 0.5 to 6 parts by weight based on 100 parts by weight of the polyol component, but the amount is not limited thereto. If the amount of the surfactant is too small, there may be a problem of non-uniform molding of the foam, and if the amount of the surfactant is too much, foam shrinkage may occur.

As the blowing agent used in the present invention, a known blowing agent conventionally used for producing polyurethane foam may be appropriately selected and used in consideration of various physical properties of the foam required.

In the present invention, water may be typically used as such a blowing agent, and one selected from the group consisting of other methylene chloride, n-butane, isobutane, n-pentane, isopentane, dimethyl ether, acetone, carbon dioxide, 1,1-dichloro-1-fluoroethane or combinations thereof may be used. These blowing agents may be appropriately used according to a known method of use and depending on the density or other properties of the foam required.

In the polyol premix composition of the present invention, there is no particular limitation on the amount of the blowing agent used—for example, 0.1 to 60 parts by weight, more specifically 0.5 to 55 parts by weight based on 100 parts by weight of the polyol component may be used, but the amount of the blowing agent is not limited thereto.

In one embodiment of the present invention, as a blowing agent, 0.5 to 10 parts by weight of water alone or a mixture of 1 to 6 parts by weight of water and 0.1 to 49 parts by weight of methylene chloride based on 100 parts by weight of the polyol component may be used, but the blowing agent is not limited thereto.

The polyol premix composition of the present invention may further comprise an auxiliary additive selected from the group consisting of a flame retardant, a colorant, a UV stabilizer, a thickener, a foam stabilizer, a filler or combinations thereof within a range that does not impair desired physical properties.

The content of the auxiliary additive is not particularly limited and may be selected within a range that does not impair the desired physical properties of the polyol premix composition. In one embodiment, the auxiliary additive may be comprised in 0.01 to 5 parts by weight, more preferably 0.1 to 2 parts by weight based on 100 parts by weight of the polyol component.

In another aspect, the present invention provides a two-component type composition for preparing polyurethane foam, comprising the polyol premix composition of the present invention as a first component; and a polyisocyanate as a second component.

In the present invention, the polyisocyanate may be used without particular limitation as long as it can be used for the production of polyurethane foam. For example, polyisocyanates selected from the group consisting of aliphatic polyisocyanates, cycloaliphatic polyisocyanates, araliphatic polyisocyanates, aromatic polyisocyanates, heterocyclic polyisocyanates or combinations thereof may be used, and unmodified polyisocyanates or any modified polyisocyanate may be used.

Specifically, the polyisocyanate may be selected from the group consisting of methylene diisocyanate, ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3-diisocyanate, cyclohexane-1,4-diisocyanate, isophorone diisocyanate, 2,4-hexahydrotoluene diisocyanate, 2,6-hexahydrotoluene diisocyanate, dicyclohexymethane-4,4'-diisocyanate (HMDI), 1,3-phenylene diisocyanate, 1,4-phenylene diisocyanate, 2,4-toluene diisocyanate, 2,6-toluene diisocyanate, diphenylmethane-2,4'-diisocyanate, methylene diphenyl diisocyanate (MDI), polymeric methylene diphenyl diisocyanate (PMDI), naphthalene-1,5-diisocyanate or combinations thereof.

In one embodiment, as the polyisocyanate, toluene diisocyanate in which 2,4-toluene diisocyanate and 2,6-toluene diisocyanate are mixed (2,4-/2,6-isomer ratio=80/20) or polymeric methylene diphenyl diisocyanate may be used.

In the present invention, the amount of polyisocyanate used is preferably an isocyanate index (NCO index) of 70 to 130, particularly preferably 80 to 120, and even more preferably 100 to 120. The isocyanate index is the ratio of the number of equivalents of isocyanate to the number of equivalents of hydroxyl groups present in polyol in a urethane reactant, and it means the amount of isocyanate used relative to the theoretical equivalent. An isocyanate index of less than 100 means that an excess of polyol is present, and an isocyanate index of greater than 100 means that an excess of isocyanate is present. If the isocyanate index is less than 70, there is a problem in that the reactivity is low and the gelling reaction is delayed and the curing is not possible. If the isocyanate index is more than 130, there is a problem in that a hard segment is excessively increased and shrinkage occurs.

In the two-component type composition for preparing polyurethane foam of the present invention, the first component and the second component may exist separately without contact, and they may be mixed immediately before use or in situ.

In another aspect, the present invention provides a method for preparing polyurethane foam, comprising mixing and reacting the polyol premix composition of the present invention as a first component; and a polyisocyanate as a second component, and polyurethane foams prepared thereby, such as flexible or rigid polyurethane foams.

When the polyol premix composition of the present invention is used in the production of the polyurethane foam, the polyurethane foam can be prepared by adding polyisocyanate to the polyol premix composition, stirring, and then putting it into a mold to proceed with curing and foaming.

When the two-component type composition for preparing polyurethane foam is used in the production of the polyurethane foam, the polyurethane foam can be prepared by mixing the first component and the second component comprised in the composition, stirring, and then putting it into a mold to proceed with curing and foaming.

Equipment or conditions (temperature, time, etc.) used for preparing polyurethane foam are not particularly limited, and commonly employed equipment or conditions may be used as they are or modified appropriately.

The present invention is explained in more detail through the following Examples and Comparative Examples. However, the scope of the present invention is not limited thereby in any manner.

EXAMPLES

Preparation of Polyol Composition Comprising Anhydrosugar Alcohol and Anhydrosugar Alcohol Polymer Example A1: Preparation of a Polyol Composition Using 97 wt % Glucose and a Thin-Film Distiller 1,819 g of a liquid hydrogenated sugar composition having a concentration of 55 wt % (sorbitol 96 wt %, mannitol 0.9 wt % and disaccharide or higher polysaccharide alcohol 3.1 wt % based on the total weight of solids) was obtained by hydrogenating a glucose product having a purity of 97% in the presence of a nickel catalyst and under a temperature of 125° C. and a hydrogen pressure of 60 atm. 1,000 g of a concentrated hydrogenated sugar composition was obtained by putting this composition in a batch reactor equipped with an agitator and heating it to 100° C. for concentration.

The reactor was charged with 1,000 g of the concentrated hydrogenated sugar composition and 9.6 g of sulfuric acid.

Thereafter, the temperature inside the reactor was raised to about 135° C., and a dehydration reaction was performed under a reduced pressure of about 45 mmHg to convert the concentrated hydrogenated sugar composition to anhydrosugar alcohol. After completion of the dehydration reaction, the temperature of the reaction product was cooled to 110° C. or less, and about 15.7 g of 50% sodium hydroxide aqueous solution was added to neutralize the reaction product. Thereafter, the temperature was cooled to 100° C. or less and the solution was concentrated for 1 hour or more under a reduced pressure of 45 mmHg to remove residual moisture and low-boiling substances to obtain about 831 g of the converted anhydrosugar alcohol solution. As a result of analyzing the obtained converted anhydrosugar alcohol solution by gas chromatography, the amount converted to isosorbide was 71.9 wt %, and using this, the molar conversion rate from sorbitol to isosorbide was calculated as 77.6%.

831 g of the obtained converted anhydrosugar alcohol solution was put into a thin-film distiller (SPD) to proceed with distillation. At this time, distillation was carried out at a temperature of 160° C. and a vacuum pressure of 1 mbar, and about 589 g of distillate was obtained (distillation yield: about 70.9%). At this time, the purity of isosorbide in the distillate was measured to be 96.8%, and the distillation yield of isosorbide calculated therefrom was 95.3%. After separating the distillate, about 242 g of a polyol composition comprising 11.5 wt % of isosorbide (dianhydrosugar alcohol), 0.4 wt % of isomannide (dianhydrosugar alcohol), 7.4 wt % of sorbitan (monoanhydrosugar alcohol), 2.5 wt % of disaccharide or higher polysaccharide alcohols and anhydrosugar alcohol derived therefrom and 78.2 wt % of polymers thereof, and having the number average molecular weight of 208 g/mol, the polydispersity index of 1.25, the hydroxyl value of 751 mg KOH/g and an average number of —OH groups per molecule of 2.78 was obtained.

Example A2: Preparation of a Polyol Composition Using a Saccharide Composition Containing 85.2 wt % of Glucose and a Thin-Film Distiller Except for the use of a 85.2 wt % glucose-containing saccharide composition (85.2 wt % of glucose and 14.8 wt % of total of mannose, fructose and polysaccharides (disaccharide or higher sugars such as maltose)) instead of a glucose product with a purity of 97%, the hydrogenation reaction was carried out in the same manner as in Example A1 to obtain 1,852 g of a liquid hydrogenated sugar composition having a concentration of 54 wt % (based on solid content, 84.1 wt % of sorbitol, 2.8 wt % of mannitol and 13.1 wt % of disaccharide or higher polysaccharide alcohol). 1,000 g of a concentrated hydrogenated sugar composition was obtained by putting this composition in a batch reactor equipped with an agitator and heating it to 100° C. for concentration.

Except for changing the content of sulfuric acid from 9.6 g to 8.4 g and changing the content of 50% sodium hydroxide aqueous solution from 15.7 g to 13.7 g, 1,000 g of the concentrated hydrogenated sugar composition was converted into anhydrosugar alcohol by performing a dehydration reaction in the same manner as in Example A1. As a result of the dehydration reaction, about 846 g of the converted anhydrosugar alcohol solution was obtained. As a result of analyzing the obtained converted anhydrosugar alcohol solution by gas chromatography, the amount converted to isosorbide was 61.7 wt %, and using this, the molar conversion rate from sorbitol to isosorbide was calculated as 77.4%.

Thin-film distillation was performed on 846 g of the obtained converted anhydrous sugar alcohol solution in the same manner as in Example A1 to obtain about 528 g of a distillate (distillation yield: about 62.4%). At this time, the purity of isosorbide in the distillate was measured to be 96.5%, and the distillation yield of isosorbide calculated therefrom was 97.6%. After separating the distillate, about 318 g of a polyol composition comprising 4.0 wt % of isosorbide (dianhydrosugar alcohol), 1.6 wt % of isomannide (dianhydrosugar alcohol), 2.1 wt % of sorbitan (monoanhydrosugar alcohol), 5.1 wt % of disaccharide or higher polysaccharide alcohols and anhydrosugar alcohol derived therefrom and 87.2 wt % of polymers thereof, and having the number average molecular weight of 720 g/mol, the polydispersity index of 2.54, the hydroxyl value of 754 mg KOH/g and an average number of —OH groups per molecule of 9.68 was obtained.

Example A3: Preparation of a Polyol Composition Using a Saccharide Composition Containing 50.2 wt % of Glucose and a Thin-Film Distiller Except for the use of a 50.2 wt % glucose-containing saccharide composition (50.2 wt % of glucose and 49.8 wt % of total of mannose, fructose and polysaccharides (disaccharide or higher sugars such as maltose)) instead of a glucose product with a purity of 97%, the hydrogenation reaction was carried out in the same manner as in Example A1 to obtain 1,819 g of a liquid hydrogenated sugar composition having a concentration of 55 wt % (based on solid content, 48.5 wt % of sorbitol, 3.6 wt % of mannitol and 47.9 wt % of disaccharide or higher polysaccharide alcohol). 1,000 g of a concentrated hydrogenated sugar composition was obtained by putting this composition in a batch reactor equipped with an agitator and heating it to 100° C. for concentration.

Except for changing the content of sulfuric acid from 9.6 g to 4.85 g and changing the content of 50% sodium hydroxide aqueous solution from 15.7 g to 7.9 g, 1,000 g of the concentrated hydrogenated sugar composition was converted into anhydrosugar alcohol by performing a dehydration reaction in the same manner as in Example A1. As a result of the dehydration reaction, about 890 g of the converted anhydrosugar alcohol solution was obtained. As a result of analyzing the obtained converted anhydrosugar alcohol solution by gas chromatography, the amount converted to isosorbide was 33.7 wt %, and using this, the molar conversion rate from sorbitol to isosorbide was calculated as 77.1%.

Thin-film distillation was performed on 890 g of the obtained converted anhydrous sugar alcohol solution in the same manner as in Example A1 to obtain about 304 g of a distillate (distillation yield: about 34.2%). At this time, the purity of isosorbide in the distillate was measured to be 96.9%, and the distillation yield of isosorbide calculated therefrom was 98.3%. After separating the distillate, about 586 g of a polyol composition comprising 0.9 wt % of isosorbide (dianhydrosugar alcohol), 2.1 wt % of isomannide (dianhydrosugar alcohol), 0.9 wt % of sorbitan (monoanhydrosugar alcohol), 6.2 wt % of disaccharide or higher polysaccharide alcohols and anhydrosugar alcohol derived therefrom and 89.9 wt % of polymers thereof, and having the number average molecular weight of 1,480 g/mol, the polydispersity index of 3.19, the hydroxyl value of 755 mg KOH/g and an average number of —OH groups per molecule of 19.92 was obtained.

Comparative Example A1: Preparation of Polyol Composition Using 99.9 wt % of Glucose Crystals and Thin-Film Distillation Except for the use of glucose crystals with a purity of 99.9 wt % separated from the glucose manufacturing process instead of the glucose product with a purity of 97%, the hydrogenation reaction was carried out in the same manner as in Example A1 to obtain 1,819 g of a liquid hydrogenated sugar composition having a concentration of 55 wt % (based on solid content, 99.1 wt % of sorbitol, 0.2 wt % of mannitol and 0.7 wt % of disaccharide or higher polysaccharide alcohol). 1,000 g of a concentrated hydrogenated sugar composition was obtained by putting this composition in a batch reactor equipped with an agitator and heating it to 100° C. for concentration.

Except for changing the content of sulfuric acid from 9.6 g to 9.9 g and changing the content of 50% sodium hydroxide aqueous solution from 15.7 g to 16.2 g, 1,000 g of the concentrated hydrogenated sugar composition was converted into anhydrosugar alcohol by performing a dehydration reaction in the same manner as in Example A1. As a result of the dehydration reaction, about 827 g of the converted anhydrosugar alcohol solution was obtained. As a result of analyzing the obtained converted anhydrosugar alcohol solution by gas chromatography, the amount converted to isosorbide was 74.2 wt %, and using this, the molar conversion rate from sorbitol to isosorbide was calculated as 77.2%.

Thin-film distillation was performed on 827 g of the obtained converted anhydrous sugar alcohol solution in the same manner as in Example A1 to obtain about 555 g of a distillate (distillation yield: about 67.1%). At this time, the purity of isosorbide in the distillate was measured to be 96.7%, and the distillation yield of isosorbide calculated therefrom was 87.5%. After separating the distillate, about 272 g of a polyol composition comprising 28.2 wt % of isosorbide (dianhydrosugar alcohol), 17.4 wt % of sorbitan (monoanhydrosugar alcohol) and 54.4 wt % of polymers thereof, and having the number average molecular weight of 192 g/mol, the polydispersity index of 1.12, the hydroxyl value of 740 mg KOH/g and an average number of —OH groups per molecule of 2.53 was obtained.

Comparative Example A2: Preparation of a Polyol Composition Using a Saccharide Composition Containing 40.1 wt % of Glucose and a Thin-Film Distiller Except for the use of a 40.1 wt % glucose-containing saccharide composition (40.1 wt % of glucose and 59.9 wt % of total of mannose, fructose and polysaccharides (disaccharide or higher sugars such as maltose)) instead of a glucose product with a purity of 97%, the hydrogenation reaction was carried out in the same manner as in Example A1 to obtain 1,819 g of a liquid hydrogenated sugar composition having a concentration of 55 wt % (based on solid content, 38.8 wt % of sorbitol, 4.1 wt % of mannitol and 57.1 wt % of disaccharide or higher polysaccharide alcohol). 1,000 g of a concentrated hydrogenated sugar composition was obtained by putting this composition in a batch reactor equipped with an agitator and heating it to 100° C. for concentration.

Except for changing the content of sulfuric acid from 9.6 g to 3.9 g and changing the content of 50% sodium hydroxide aqueous solution from 15.7 g to 6.3 g, 1,000 g of the concentrated hydrogenated sugar composition was converted into anhydrosugar alcohol by performing a dehydration reaction in the same manner as in Example A1. As a result of the dehydration reaction, about 902 g of the converted anhydrosugar alcohol solution was obtained. As a result of analyzing the obtained converted anhydrosugar alcohol solution by gas chromatography, the amount converted to isosorbide was 26.8 wt %, and using this, the molar conversion rate from sorbitol to isosorbide was calculated as 77.4%.

Thin-film distillation was performed on 902 g of the obtained converted anhydrous sugar alcohol solution in the same manner as in Example A1 to obtain about 246 g of a distillate (distillation yield: about 27.3%). At this time, the purity of isosorbide in the distillate was measured to be 96.1%, and the distillation yield of isosorbide calculated therefrom was 97.8%. After separating the distillate, about 663 g of a polyol composition comprising 0.7 wt % of isosorbide (dianhydrosugar alcohol), 2.3 wt % of isomannide (dianhydrosugar alcohol), 0.5 wt % of sorbitan (monoanhydrosugar alcohol), 6.5 wt % of disaccharide or higher polysaccharide alcohols and anhydrosugar alcohol derived therefrom and 90.0 wt % of polymers thereof, and having the number average molecular weight of 1,590 g/mol, the polydispersity index of 3.42, the hydroxyl value of 754 mg KOH/g and an average number of —OH groups per molecule of 21.37 was obtained.

Comparative Example A3: Preparation of a Polyol Composition Using a Saccharide Composition Containing 96.8 wt % of Glucose and Simple Vacuum Distillation Except for the use of a 96.8 wt % glucose-containing saccharide composition (96.8 wt % of glucose and 3.2 wt % of total of mannose, fructose and polysaccharides (disaccharide or higher sugars such as maltose)) instead of a glucose product with a purity of 97%, the hydrogenation reaction was carried out in the same manner as in Example A1 to obtain 1,819 g of a liquid hydrogenated sugar composition having a concentration of 55 wt % (based on solid content, 95.7 wt % of sorbitol, 1.1 wt % of mannitol and 3.2 wt % of disaccharide or higher polysaccharide alcohol). 1,000 g of a concentrated hydrogenated sugar composition was obtained by putting this composition in a batch reactor equipped with an agitator and heating it to 100° C. for concentration.

1,000 g of the concentrated hydrogenated sugar composition was converted into anhydrosugar alcohol by performing a dehydration reaction in the same manner as in Example A1. As a result of the dehydration reaction, about 832 g of the converted anhydrosugar alcohol solution was obtained. As a result of analyzing the obtained converted anhydrosugar alcohol solution by gas chromatography, the amount converted to isosorbide was 71.5 wt %, and using this, the molar conversion rate from sorbitol to isosorbide was calculated as 77.5%.

Simple vacuum distillation was performed on 832 g of the obtained converted anhydrosugar alcohol solution to obtain about 461 g of a distillate (distillation yield: about 55.4%). At this time, the purity of isosorbide in the distillate was measured to be 96.6%, and the distillation yield of isosorbide calculated therefrom was 74.9%. After separating the distillate, about 371 g of a polyol composition comprising 40.4 wt % of isosorbide (dianhydrosugar alcohol), 0.4 wt % of isomannide (dianhydrosugar alcohol, 3.2 wt % of sorbitan (monoanhydrosugar alcohol), 2.0 wt % of disaccharide or higher polysaccharide alcohols and anhydrosugar alcohol derived therefrom and 54.0 wt % of polymers thereof, and having the number average molecular weight of 210 g/mol, the polydispersity index of 3.94, the hydroxyl value of 710 mg KOH/g and an average number of —OH groups per molecule of 2.66 was obtained.

The yields of the polyol compositions of Examples A1 to A3 and Comparative Examples A1 to A3 are shown in Table 1 below, and the composition and physical property values of each polyol composition are shown in Table 2 below.

TABLE 1

| Categories | | Examples | | | Comparative Examples | | |
|---|---|---|---|---|---|---|---|
| Step | Item | A1 | A2 | A3 | A1 | A2 | A3 |
| Hydrogenation | Before reaction: Glucose (wt %) | 97.0 | 85.2 | 50.2 | 99.9 | 40.1 | 96.8 |
| | After reaction: Sorbitol (wt %) | 96.0 | 84.1 | 48.5 | 99.1 | 38.8 | 95.7 |
| | Mannitol (wt %) | 0.9 | 2.8 | 3.6 | 0.2 | 4.1 | 1.1 |
| | Polysaccharide alcohols (wt %) | 3.1 | 13.1 | 47.9 | 0.7 | 57.1 | 3.2 |
| Conversion | Converted anhydrosugar alcohol solution (g) | 831 | 846 | 890 | 827 | 902 | 832 |
| | ISB conversion content (wt %) | 71.9 | 61.7 | 33.7 | 74.2 | 26.8 | 71.5 |
| | Molar conversion rate to ISB (%) | 77.6 | 77.4 | 77.1 | 77.2 | 77.4 | 77.5 |
| Distillation | Distillation yield (%) | 70.9 | 62.4 | 34.2 | 67.1 | 27.3 | 55.4 |
| | Purity of ISB in the distillate (%) | 96.8 | 96.5 | 96.9 | 96.7 | 96.1 | 96.6 |
| | Distillation yield of ISB (%) | 95.3 | 97.6 | 98.3 | 87.5 | 97.8 | 74.9 |

TABLE 2

| | Categories | Examples | | | Comparative Examples | | |
|---|---|---|---|---|---|---|---|
| | | A1 | A2 | A3 | A1 | A2 | A3 |
| Component of the polyol composition | Isosorbide (wt %) | 11.5 | 4.0 | 0.9 | 28.2 | 0.7 | 40.4 |
| | Isomannide (wt %) | 0.4 | 1.6 | 2.1 | — | 2.3 | 0.4 |
| | Sorbitan (wt %) | 7.4 | 2.1 | 0.9 | 17.4 | 0.5 | 3.2 |
| | Polysaccharide alcohols and anhydrosugar alcohols derived therefrom (wt %) | 2.5 | 5.1 | 6.2 | — | 6.5 | 2.0 |
| | Polymer (wt %) | 78.2 | 87.2 | 89.9 | 54.4 | 90.0 | 54.0 |
| Properties of the polyol composition | Number average molecular weight (g/mol) | 208 | 720 | 1,480 | 192 | 1,590 | 210 |
| | Average number of OH groups per molecule | 2.78 | 9.68 | 19.92 | 2.53 | 21.37 | 2.66 |
| | Hydroxyl value (mg KOH/g) | 751 | 754 | 755 | 740 | 754 | 710 |
| | Polydispersity index | 1.25 | 2.54 | 3.19 | 1.12 | 3.42 | 3.94 |

Yield Measurement Method

1) Molar conversion rate to isosorbide (ISB)

$$\text{Molar conversion rate to } ISB\ (\%) = \frac{\text{mole of generated } ISB}{\text{mole of used sorbitol}} \times 100(\%)$$

2) Isosorbide (ISB) conversion content

Using gas chromatography analysis, the content (wt %) of isosorbide in the converted anhydrosugar alcohol solution was measured, and the isosorbide conversion content indicates the purity of isosorbide (ISB) in the converted anhydrosugar alcohol solution.

3) Distillation yield $$\text{Distillation yield }(\%) = \frac{\text{Mass of distillate (g)}}{\text{Mass of the converted anhydrosugar alcohol solution (g)}} \times 100(\%)$$

4) Distillation yield of isosorbide (ISB)

$$\text{Distillation yield of } ISB = \frac{\text{Mass of isosorbide in distillate (g)}}{\text{Mass of isosorbide in the converted anhydrosugar alcohol solution (g)}} \times 100(\%)$$

Method for Measuring Physical Properties of Polyol Composition

1) Number average molecular weight (Mn) and polydispersity index (PDI)

After dissolving 1 to 3 parts by weight of each of the polyol compositions prepared in the above Examples and Comparative Examples in N,N-dimethylformamide, number average molecular weight (Mn) and polydispersity index (PDI) were measured using a Gel Permeation Chromatography (GPC) apparatus (Agilent Co.). The column used at this time was PLgel 3 μm MIXED-E 300×7.5 mm (Agilent Co.), and the column temperature was 50° C. The developing solvent used was N,N-dimethylformamide containing 0.05 M NaBr, which was used by flowing at 0.5 mL/min, and polystyrene (Aldrich Co.) was used as a standard material.

2) hydroxyl value

After esterification of each of the polyol compositions prepared in the Examples and Comparative Examples with an excess of phthalic anhydride under an imidazole catalyst according to ASTM D-4274D, the hydroxyl value of the polyol composition was measured by titrating the remaining phthalic anhydride with 0.5 N sodium hydroxide (NaOH).

3) Average number of —OH groups per molecule

The average number of —OH groups per molecule in the polyol composition was calculated according to the formula below.

[Average number of —OH groups per molecule]=
(hydroxyl value×number average molecular weight)/56,100

Preparation of Alkylene Oxide-Added Polyol Composition

Example B1: Preparation of an Alkylene Oxide-Added Polyol Composition Using the Polyol Composition of Example A1

100 g of the polyol composition obtained in Example A1 and 0.1 g of potassium hydroxide (KOH) were added to a high-pressure reactor equipped with an agitator, the temperature was raised to 120° C., and then 100 g of propylene oxide was added thereto. Thereafter, by reacting at 120° C. for 3 hours, 191 g of an alkylene oxide-added polyol composition having an added amount of propylene oxide of 100 parts by weight based on 100 parts by weight of the polyol composition was obtained.

Example B2: Preparation of an Alkylene Oxide-Added Polyol Composition Using the Polyol Composition of Example A2

Except for using 100 g of the polyol composition obtained in Example A2 instead of the polyol composition obtained in Example A1, 190 g of an alkylene oxide-added polyol composition having an added amount of propylene oxide of 100 parts by weight based on 100 parts by weight of the polyol composition was obtained in the same manner as in Example B1.

Example B3: Preparation of an Alkylene Oxide-Added Polyol Composition Using the Polyol Composition of Example A3

Except for using 100 g of the polyol composition obtained in Example A3 instead of the polyol composition obtained in Example A1, 192 g of an alkylene oxide-added polyol composition having an added amount of propylene oxide of 100 parts by weight based on 100 parts by weight of the polyol composition was obtained in the same manner as in Example B1.

Comparative Example B1: Preparation of an Alkylene Oxide-Added Polyol Composition Using the Polyol Composition of Comparative Example A1

Except for using 100 g of the polyol composition obtained in Comparative Example A1 instead of the polyol composition obtained in Example A1, 187 g of an alkylene oxide-added polyol composition having an added amount of propylene oxide of 100 parts by weight based on 100 parts by weight of the polyol composition was obtained in the same manner as in Example 1.

Comparative Example B2: Preparation of an Alkylene Oxide-Added Polyol Composition Using the Polyol Composition of Comparative Example A2

Except for using 100 g of the polyol composition obtained in Comparative Example A2 instead of the polyol composition obtained in Example A1, 192 g of an alkylene oxide-added polyol composition having an added amount of propylene oxide of 100 parts by weight based on 100 parts by weight of the polyol composition was obtained in the same manner as in Example B1

Comparative Example B3: Preparation of an Alkylene Oxide-Added Polyol Composition Using the Polyol Composition of Comparative Example A3

Except for using 100 g of the polyol composition obtained in Comparative Example A3 instead of the polyol composition obtained in Example A1, 190 g of an alkylene oxide-added polyol composition having an added amount of propylene oxide of 100 parts by weight based on 100 parts by weight of the polyol composition was obtained in the same manner as in Example B1.

Preparation of Rigid Polyurethane Foam

Examples C1 to C3 and Comparative Examples C1 to C4

The polyol component, catalyst, surfactant and blowing agent were mixed according to the components and content ratios shown in Table 3 below, and sufficiently mixed for 1 to 3 minutes at a stirring speed of 3,000 rpm to prepare a polyol premix composition as a first component of a two-component type composition for preparing polyurethane foam of the present invention.

A polyisocyanate component, which is a second component, was added to the prepared polyol premix composition, and stirred at a stirring speed of 3,000 rpm for 7 to 10 seconds to prepare a two-component type composition for preparing polyurethane foam of the present invention.

Thereafter, a polyethylene film was laid in a square box mold of 250 mm×250 mm in a square shape, and the prepared composition for preparing polyurethane foam was poured thereon. As a result of checking the curing reaction heat of the polyurethane foam with a rod thermometer, it was confirmed that the temperature was 120° C. Then, the physical properties of the prepared polyurethane foam specimens were measured by the following evaluation method, and the results are shown in Table 3 below.

Method of Measuring Physical Properties of Polyurethane Foam Specimen

Molding density: measured according to ASTM D-1621.
Compressive strength: measured according to ASTM D-1621.
Thermal conductivity: measured according to ASTM D-1621.

Ingredients Used

1) Polyol
SL-494: Sorbitol-based polyol with hydroxyl value of 460 to 500 mg KOH/g (product of Mitsui Chemicals & SKC Polyurethanes, SL-494)
SR-500: Basic polyol with a hydroxyl value of 480 to 520 mg KOH/g (product of Mitsui Chemicals & SKC Polyurethanes, SR-500)
PE-400: Glycerin and pentaerythritol-based polyol with a hydroxyl value of 400 mg KOH/g (product of SKC, PE-400)
AK-1001: Polyol with hydroxyl value of 320 to 340 mg KOH/g (product of Aekyung Chemical, AK POL-1001)
Example B1: Alkylene oxide-added polyol composition prepared in Example B1
Example B2: Alkylene oxide-added polyol composition prepared in Example B2
Example B3: Alkylene oxide-added polyol composition prepared in Example B3
Comparative Example B1: Alkylene oxide-added polyol composition prepared in Comparative Example B1
Comparative Example B2: Alkylene oxide-added polyol composition prepared in Comparative Example B2
Comparative Example B3: Alkylene oxide-added polyol composition prepared in Comparative Example B3
2) Polyisocyanate
M20R: polymeric methylene diphenyl diisocyanate (product of BASF Korea, M20R)
The NCO index, which is the equivalent ratio of isocyanate to water and polyol having a hydroxyl group, was fixed at 110.
3) Catalyst
PC5: Amine-based catalyst (Air Products, PC5)
33LV: Amine-based catalyst (Air Products, DABCO 33LV)
4) Surfactant
B8462: Surfactant (product of Evonik, B8462)
5) Blowing Agent
water
141b: 1,1-dichloro-1-fluoroethane (product of Soo Kyung Chemical, HCFC-141b)

TABLE 3

| | Categories | | Examples | | | Comparative Examples | | | |
|---|---|---|---|---|---|---|---|---|---|
| | | | C1 | C2 | C3 | C1 | C2 | C3 | C4 |
| Component (parts by weight) | Polyol | SL-494 | 20 | 20 | 20 | 20 | 20 | 25 | 20 |
| | | SR-500 | 20 | 20 | 20 | 20 | 20 | 25 | 20 |
| | | PE-400 | 20 | 20 | 20 | 20 | 20 | 25 | 20 |
| | | AK-1001 | 20 | 20 | 20 | 20 | 20 | 25 | 20 |
| | | Exam. B1 | 20 | — | — | — | — | — | — |
| | | Exam. B2 | — | 20 | — | — | — | — | — |
| | | Exam. B3 | — | — | 20 | — | — | — | — |
| | | Com. Exam. B1 | — | — | — | 20 | — | — | — |
| | | Com. Exam. B2 | — | — | — | — | 20 | — | — |
| | | Com. Exam. B3 | — | — | — | — | — | — | 20 |
| | Blowing agent | Water | | 6 | | | 6 | | |
| | | 141b | | 45 | | | 45 | | |
| | Catalyst | PC5 | | 0.9 | | | 0.9 | | |
| | | 33LV | | 0.9 | | | 0.9 | | |
| | Surfactant | B8462 | | 6 | | | 6 | | |
| | Isocyanate | M20R | 148.2 | 149.5 | 149.4 | 147.5 | 149.5 | 145.4 | 148.1 |
| Properties | NCO index | | | 110 | | | 110 | | |
| | Molding density (kg/m$^3$) | | 39.9 | 39.4 | 38.8 | Foam not formed | 38.2 | 38.4 | 37.8 |
| | Compressive strength (kgf/mm$^2$) | | 0.03443 | 0.03440 | 0.03435 | | 0.03430 | 0.03431 | 0.03424 |
| | Thermal conductivity (W/mK) | | 0.02231 | 0.02235 | 0.02238 | | 0.02259 | 0.02255 | 0.02262 |

As shown in Table 3, the specimens of Examples C1 to C3 prepared using the polyol compositions of Examples A1 to A3 according to the present invention as a polyol component had good foam conditions, and exhibited improved molding density, compressive strength, excellent thermal insulation (low thermal conductivity) and improved economic feasibility due to cost reduction compared to the specimen of Comparative Example C3, which is a conventional polyurethane foam specimen.

On the other hand, in the case of the specimen of Comparative Example C1 prepared using the polyol composition of Comparative Example A1 as a polyol component, it was difficult to form the polyurethane foam due to the low number average molecular weight and low polydispersity index of the polyol composition. In the case of the specimen of Comparative Example C2 prepared using the polyol composition of Comparative Example A2 as a polyol component, due to the high number average molecular weight, high polydispersity index and high average number of —OH groups per molecule of the polyol composition, the molding density and compressive strength of the foam were low, and the heat insulating property was also poor (high thermal conductivity) compared to the specimen of Comparative Example C3, which is a specimen of conventional polyurethane foam.

In addition, in the case of the specimen of Comparative Example C4 prepared using the polyol composition of Comparative Example A3 as a polyol component, it was possible to form polyurethane foam, but the polydispersity index of the polyol composition was too high, the molding density and compressive strength of the foam were low and the thermal insulation properties were poor (high thermal conductivity) compared to the specimen of Example C3, which is a conventional polyurethane foam specimen.

The invention claimed is:

1. A polyol composition comprising:
   a) monoanhydrosugar alcohol;
   b) dianhydrosugar alcohol;
   c) a polysaccharide alcohol represented by the following Formula 1;
   d) anhydrosugar alcohol derived from a polysaccharide alcohol represented by the following Formula 1; and
   e) a polymer of one or more of a) to d);
   wherein (i) the composition has a number average molecular weight (Mn) of 193 to 1,589 g/mol;
   (ii) the composition has a polydispersity index (PDI) of 1.13 to 3.41; and
   (iii) the average number of –OH groups per molecule in the composition is 2.54 to 21.36:

[Formula 1]

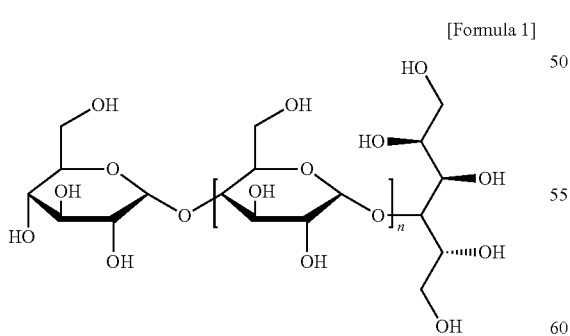

in Formula 1, n is an integer of 0 to 4.

2. The polyol composition according to claim 1, wherein d) anhydrosugar alcohol derived from a polysaccharide alcohol represented by Formula 1 is selected from a compound represented by the following Formula 2, a compound represented by the following Formula 3 or a mixture thereof:

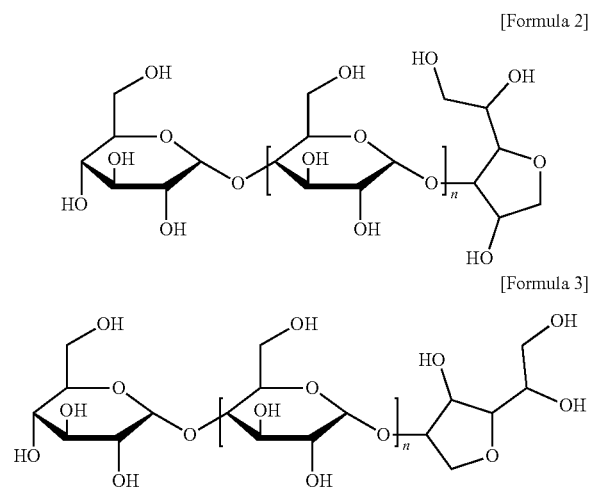

in Formulae 2 and 3, each of n is independently an integer of 0 to 4.

3. The polyol composition according to claim 1, wherein the monoanhydrosugar alcohol is monoanhydrosugar hexitol.

4. The polyol composition according to claim 1, wherein the dianhydrosugar alcohol is dianhydrosugar hexitol.

5. The polyol composition according to claim 1, wherein e) the polymer of one or more of a) to d) comprises at least one selected from the group consisting of condensation polymers prepared from the following condensation reaction:
   condensation reaction of monoanhydrosugar alcohol,
   condensation reaction of dianhydrosugar alcohol,
   condensation reaction of the polysaccharide alcohol represented by Formula 1,
   condensation reaction of anhydrosugar alcohol derived from polysaccharide alcohol represented by Formula 1,
   condensation reaction of monoanhydrosugar alcohol and dianhydrosugar alcohol,
   condensation reaction of monoanhydrosugar alcohol and polysaccharide alcohol represented by Formula 1,
   condensation reaction of monoanhydrosugar alcohol and anhydrosugar alcohol derived from polysaccharide alcohol represented by Formula 1,
   condensation reaction of dianhydrosugar alcohol and polysaccharide alcohol represented by Formula 1,
   condensation reaction of dianhydrosugar alcohol and anhydrosugar alcohol derived from polysaccharide alcohol represented by Formula 1,
   condensation reaction of polysaccharide alcohol represented by Formula 1 and anhydrosugar alcohol derived from polysaccharide alcohol represented by Formula 1,
   condensation reaction of monoanhydrosugar alcohol, dianhydrosugar alcohol and polysaccharide alcohol represented by Formula 1,
   condensation reaction of monoanhydrosugar alcohol, dianhydrosugar alcohol and anhydrosugar alcohol derived from polysaccharide alcohol represented by Formula 1,
   condensation reaction of monoanhydrosugar alcohol, polysaccharide alcohol represented by Formula 1 and anhydrosugar alcohol derived from polysaccharide alcohol represented by Formula 1,
   condensation reaction of dianhydrosugar alcohol, polysaccharide alcohol represented by Formula 1 and anhydrosugar alcohol derived from polysaccharide alcohol represented by Formula 1, or condensation reaction of monoanhydrosugar alcohol, dianhydrosugar alcohol, polysaccharide alcohol represented by Formula 1 and anhydrosugar alcohol derived from polysaccharide alcohol represented by Formula 1.

6. The polyol composition according to claim 1, which is prepared by hydrogenating a glucose-containing saccharide composition to prepare a hydrogenated sugar composition, heating the obtained hydrogenated sugar composition under an acid catalyst to a dehydration reaction by heating and conducting thin-film-distillation of the obtained dehydration reaction product.

7. The polyol composition according to claim 6, wherein the glucose-containing saccharide composition comprises 41 to 99.5 wt % of glucose based on the total weight of the glucose-containing saccharide composition.

8. The polyol composition according to claim 6, wherein the hydrogenated sugar composition comprises 0.8 to 57 wt % of the polysaccharide alcohol represented by Formula 1, based on the total dry weight of the hydrogenated sugar composition.

9. The polyol composition according to claim 6, wherein the hydrogenation is carried out under a hydrogen pressure condition of 30 to 80 atm and a heating condition of 110° C. to 135° C., the dehydration reaction is carried out under a reduced pressure condition of 1 mmHg to 100 mmHg and a heating condition of 105° C. to 200° C. and the thin-film-distillation is conducted under reduced pressure condition of 2 mbar or less and a heating condition of 150° C. to 175° C.

10. An alkylene oxide-added polyol composition prepared by adding an alkylene oxide to the polyol composition according to claim 1.

11. A polyol premix composition comprising a polyol component, a catalyst, a surfactant and a blowing agent,
wherein the polyol component is the alkylene oxide-added polyol composition according to claim 10 or a mixture of the alkylene oxide-added polyol composition and a polyol other than the alkylene oxide-added polyol composition.

12. A two-component type composition for preparing polyurethane foam, comprising the polyol premix composition according to claim 11 as a first component; and a polyisocyanate as a second component.

13. A method for preparing polyurethane foam, comprising mixing and reacting the polyol premix composition according to claim 11 as a first component; and a polyisocyanate as a second component.

14. A polyurethane foam prepared by mixing and reacting the polyol premix composition according to claim 11 as a first component; and a polyisocyanate as a second component.

\* \* \* \* \*